May 1, 1962 C. A. DAVIDSON 3,031,944
CEILING AIR DIFFUSER
Filed March 18, 1959 5 Sheets-Sheet 1

INVENTOR.
CHARLES A. DAVIDSON
BY
ATTORNEY

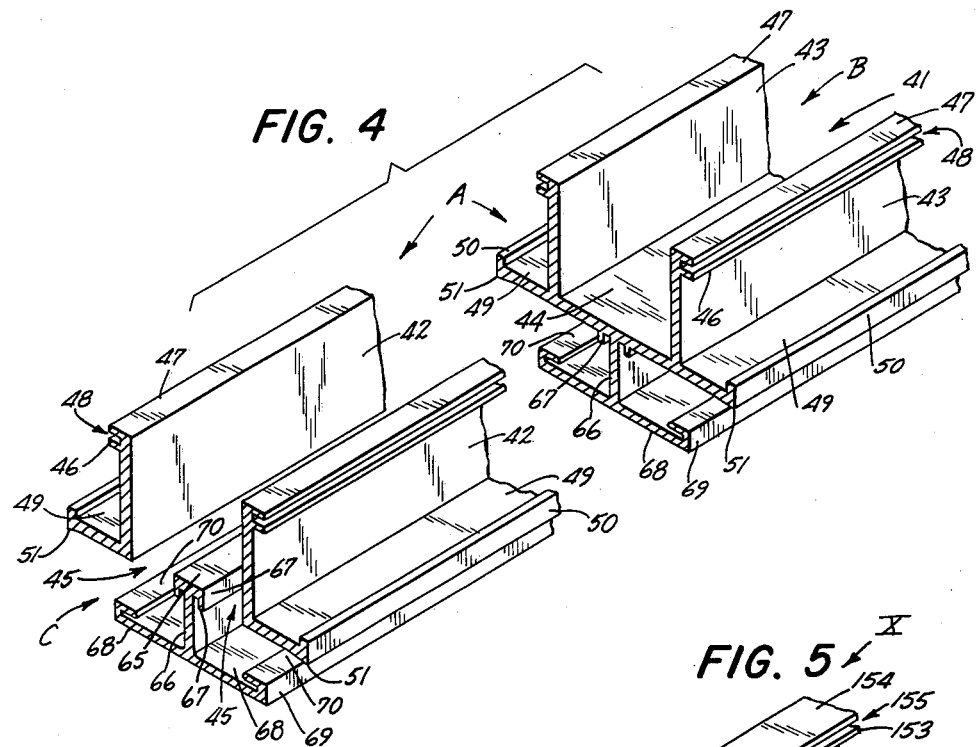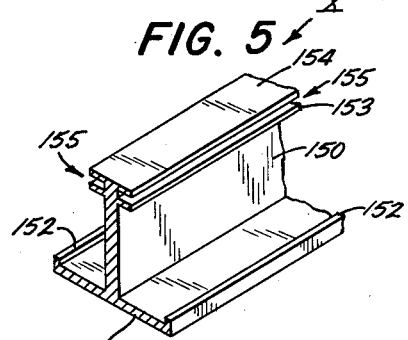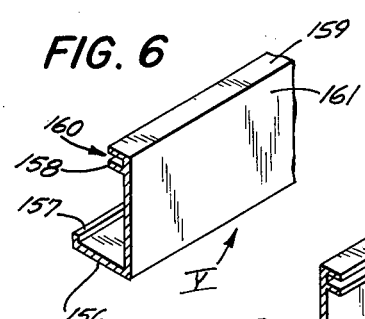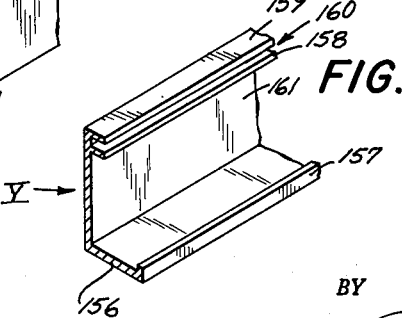

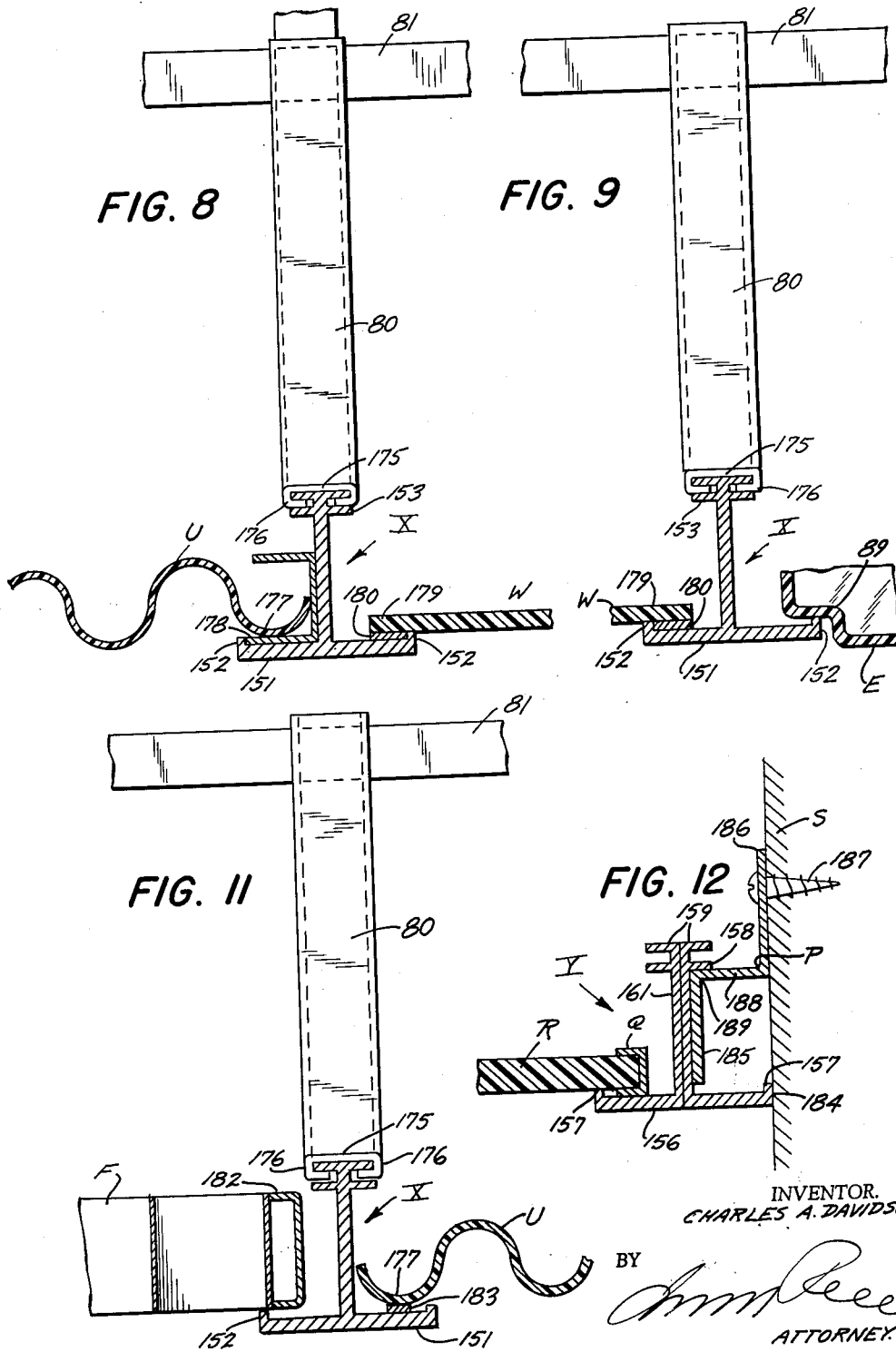

May 1, 1962 C. A. DAVIDSON 3,031,944
CEILING AIR DIFFUSER
Filed March 18, 1959 5 Sheets-Sheet 4
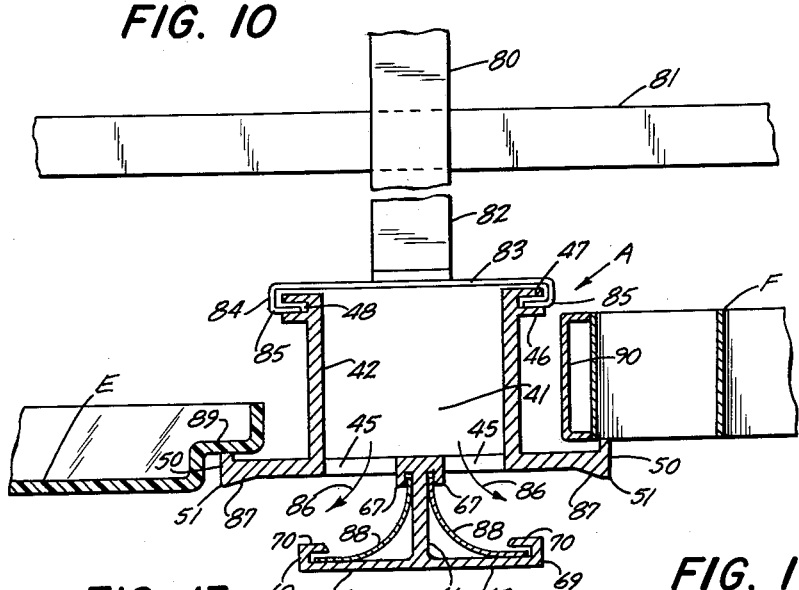
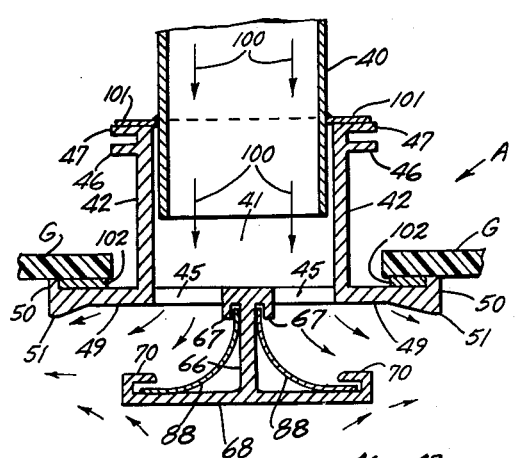
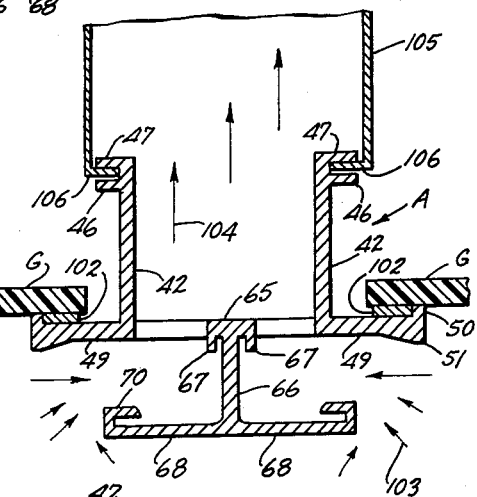
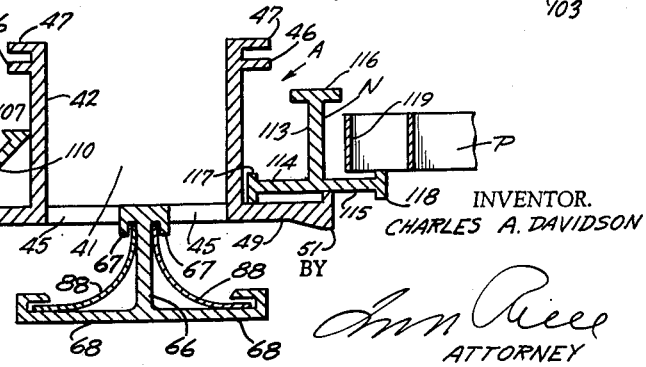
INVENTOR.
CHARLES A. DAVIDSON
BY
ATTORNEY

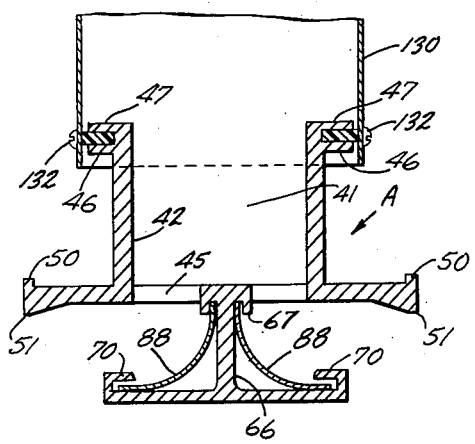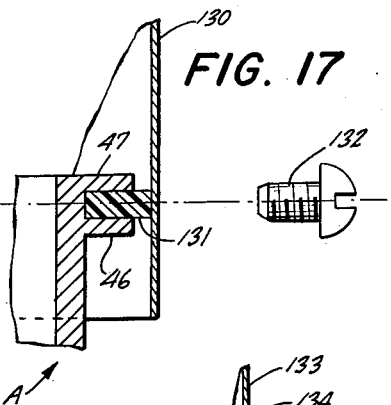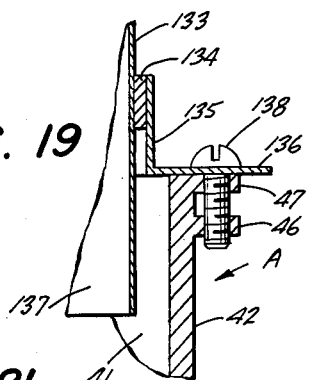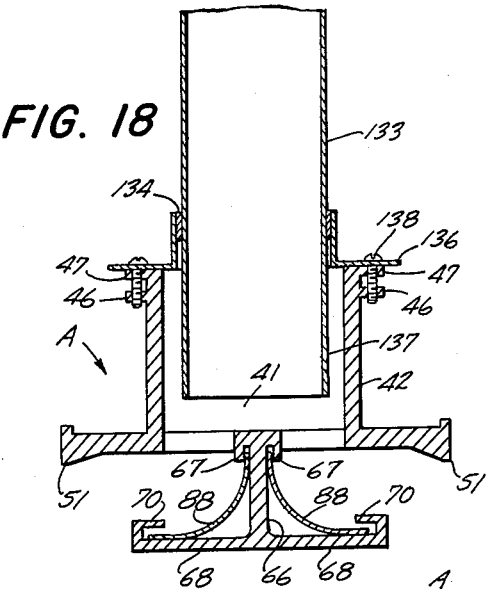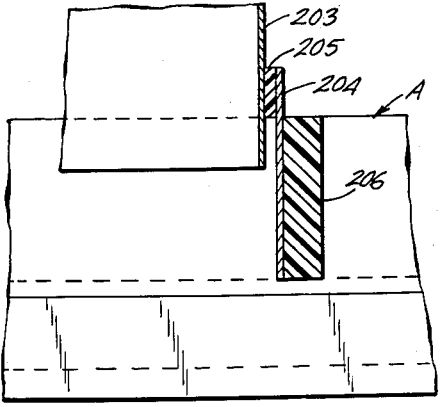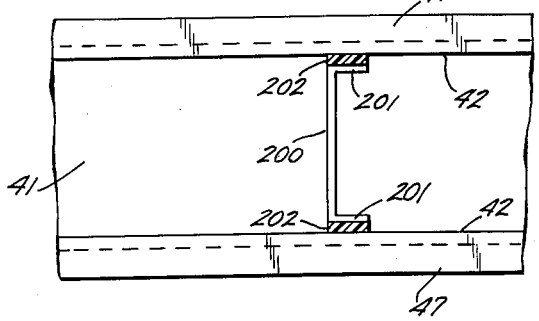

3,031,944
CEILING AIR DIFFUSER
Charles Andrew Davidson, Mount Clemens, Mich., assignor to Thermotank, Inc., St. Clair Shores, Mich., a corporation of Michigan
Filed Mar. 18, 1959, Ser. No. 800,235
4 Claims. (Cl. 98—40)

The present invention relates to a ceiling air diffuser and it particularly relates to a ceiling air diffuser construction.

It is among the objects of the present invention to provide a simple, readily installed, reliable ceiling air diffuser construction which may be readily erected and which, when installed, will have complete rigidity and be readily assembled without the use of screws or bolts.

A further object of the present invention is to provide a ceiling air diffuser construction having linear air diffuser construction which is simple in assembly and readily installed and will permit of high air output capacities, avoiding stratification while giving satisfactory heating or air cooling effects and yet assuring low sound level ratings.

Another object of the present invention is to provide a combination diffuser illuminated ceiling construction in which the light diffusing and air diffusing constructions are so separated that no discoloration will result from the air diffuser constructions as would cause discoloration or affect the light obtained from the light diffuser arrangements.

Still further objects and advantages will appear in the more detailed description set forth below, it being understood, however, that this more detailed description is by way of illustration and explanation only and not by way of limitation, since various changes therein may be made by those skilled in the art without departing from the scope and spirit of the present invention.

In accomplishing the above objects, there is provided a basic track structure or system which may consist of a main support channel with auxiliary cross support and crossing channels which may be of extruded aluminum or other light weight metal and which may be suitably suspended from a supporting structure.

The auxiliary cross support channels may have identical or similar structure to that of the main supports and they may be pre-cut to provide architecturally true module arrangements.

A particular feature of the present invention resides in the construction and assembly of the linear air diffusers which form part of the ceiling construction and which may be used both for supply or return of ventilating or conditioning air, and it may be used in combination with or as part of the main ceiling support channels.

The linear air diffusers may be of aluminum extrusions and be associated with the general track system so that they form part of the overall ceiling structure.

The linear air diffusers are desirably so structurally designed that the partitions can be secured to the underside of the diffuser plates.

Feeder units may also be incorporated in the ceiling to give acoustical attenuation with the volume adjustment units having a maximum capacity of 1,000 cubic feet per minute.

These linear air diffusers may be so arranged as to give the desired air distribution pattern, depending upon the shape and size of the ceiling and the type and size of the room or enclosure.

The diffuser sections are desirably designed to operate at relatively high outlet velocities in order to avoid stratification while heating or draughts while cooling and yet ensure the low sound level rating required.

The upper surface of the linear air diffuser is designed so that the contour will prevent the delivered air from striking the light diffusing medium immediately upon leaving the diffuser, and it will thus control or eliminate discoloration across the ceiling.

The lower diffuser track sections are preferably designed to accommodate a contoured insert which is painted black and which is shaped so that, in combination with the upper surface, the control pattern of the delivered air is achieved. This lower diffusing plate is also designed so that partitions or acoustical type baffles may be attached, using a simple clip-on type method.

The light diffusing media may consist of various types of translucent or transparent vinyl, Plexiglas and other types of plastic louvers or plates, and also metal louvers.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

FIG. 4 is a fragmentary perspective view, showing the linear air diffuser construction at the right with the various associated angle members integrally assembled together and showing the combination separated structure at the left with the plate structure open to permit the air outlet or diffusion, such structures being shown in smaller scale at the lower parts of FIGS. 2 and 3.

FIG. 5 is a fragmentary top perspective view of an alterantive form main channel construction positioned adjacent a wall structure.

FIGS. 6 and 7 are fragmentary top perspective views, showing alternative forms of left hand and right hand track structures respectively.

FIG. 8 is a transverse vertical sectional view taken upon the line 8—8 of FIG. 1 and upon an enlarged scale as compared to FIG. 1, showing the corrugated vinyl or other translucent sheet in position at one side and a Plexiglas flat panel at the other side.

FIG. 9 is a transverse vertical sectional view taken upon the line 9—9 of FIG. 1 and upon an enlarged scale as compared to FIG. 1, showing a Plexiglas flat panel at one side and formed arcylic panel at the other side.

FIG. 10 is a transverse vertical sectional view taken upon the line 10—10 of FIG. 1 and upon an enlarged scale as compared to FIG. 1, showing a formed acrylic panel at the left and a metal louver construction at the right mounted on either side of a linear air diffuser construction.

FIG. 11 is a vertical transverse sectional view taken upon the line 11—11 of FIG. 1 and upon an enlarged scale as compared to FIG. 1, showing a louver construction at the left and a corrugated acrylic structure at the right supported by an inverted T cross-section track or channel member.

FIG. 12 is a transverse vertical sectional view upon the line 12—12 of FIG. 1 upon an enlarged scale as compared to FIG. 1, showing a double left hand and right hand channel structure assembled together as previously shown in FIGS. 6 and 7 and connected to a wall with an acrylic or Plexiglas panel at the left.

FIG. 13 is a transverse vertical sectional view, showing the contoured diffusing unit in transverse section, with a central supply duct and contoured air diffusing passageways to assure proper mixture of the air and prevention of stratification at the output sections.

FIG. 14 is a transverse sectional view similar to FIG. 13, showing the input or exit sections with the withdrawn air being moved into a duct or open plenum area.

FIG. 15 is a transverse sectional view similar to FIGS. 13 and 14, showing an alternative formed pan type ceiling plaque and a metal or open louver structure at the right, with a central air inlet or outlet section with associated V-T type or straight inverted T type auxiliary channel track or beam members to hold the pan and the louver system in association with the central linear air diffuser.

FIG. 16 is a transverse sectional view similar to FIGS. 10 to 15, showing the details of connection of the outlet or inlet conduit to the top of the air track structure.

FIG. 17 is a fragmentary transverse sectional view upon an enalrged scale as compared to FIG. 6, showing the method of screw attachment to the duct wall in combination with a vinyl seal.

FIG. 18 is a transverse vertical sectional view similar to FIGS. 10 to 16, showing a telescoping type of inlet or outlet duct construction, associated with the basic linear air diffuser arrangement.

FIG. 19 is a fragmentary transverse sectional view upon an enlarged scale as compared to FIG. 18 of a detail showing the vinyl seal and holder construction therefor utilized in connection with the telescoping device of FIG. 18.

FIG. 20 is a fragmentary plan view, showing the duct arrangement with end seal plate fitted therein.

FIG. 21 is a detail fragmentary transverse elevational sectional view, showing a double vinyl seal associated with a duct structure.

Figure 1:
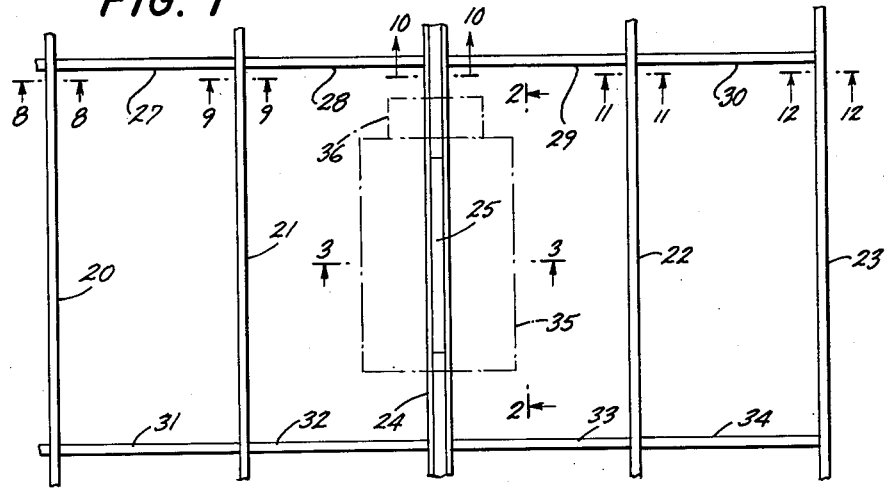
FIG. 1 is a top plan view, showing the arrangement of the track system, including the main support channels of the cross support channels, together with the position of the slots.
Figure 2:
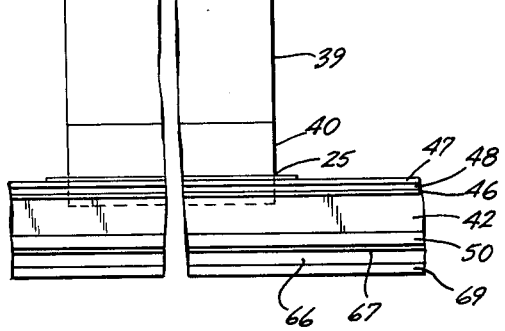
FIG. 2 is a transverse side elevational view taken from the line 2—2 of FIG. 1, and upon an enlarged scale as compared to FIG. 1, showing the arrangements of the volume damper with the linear characteristics.
Figure 3:
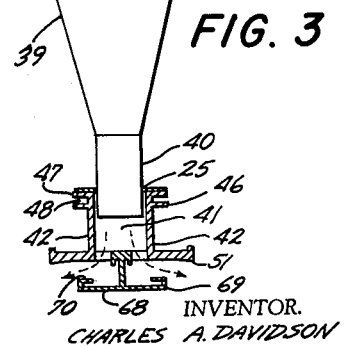
FIG. 3 is a transverse sectional view, or end elevational view, taken upon the line 3—3 of FIG. 1 and upon an enlarged scale as compared to FIG. 1.

Referring to FIGS. 1 to 3, there is shown a series of parallel main support channels 20, 21, 22 and 23 and a central channel 24 having a slot 25. There are also provided the transverse or cross-channel connections 27, 28, 29, 30, 31, 32, 33 and 34.

These channels may be spaced apart to suit the ceiling construction and the slot may be extended more or less to suit the convenience of the structure.

As shown in FIGS. 2 and 3, there is shown a main conduit or box member 35 having an inlet conduit connection 36 provided with a linear conical volume damper 37 having linear characteristics. This conical member 37 is mounted upon the plate 38 and it has a screw adjustment 38' in respect to the nut member 40' carried on the wall or spider 41'.

From the box 35 the air flows through the depending converging conical or pyramidal member 39 to the rectangular cross-section member 40, fitting into the slot 25. The rectangular cross-section member 40 will feed air directly into the chamber 41 between the side walls 42 of the main channel linear air diffuser structure A, which is best shown in FIG. 4.

Referring particularly to FIG. 4, the base structure A has a closed structure B at the right and an open structure C at the left. The side walls 42 of the open structure constitute integral continuations of the side walls 43 of the closed structure.

The central floor 44 of the chamber 41 will close off the section B, whereas the slots 45 will be provided at the open section C, permitting air to flow where the floor sections are positioned in the closed section B.

The walls 42 and 43 terminate in the outwardly extending flanges 46 and 47, which have a space or slot 48 between them to receive suitable connections or associated mechanisms, conduits or separate structures.

The upper outwardly extending horizontal side flanges 49 are extruded integrally in both sections B and C and they have the outside upwardly extending flanges 50 and the downwardly extending edge corner portions 51.

The center floor portions 65 are always left in position and on their lower side they are connected to the central wall member 66 with the side partially depending flanges 67.

The lowermost outwardly extending horizontal flanges 68 have the up-turned and in-turned side flanges 69, with the in-turned upper flange portions being indicated at 70.

The functioning of these flanges is shown in smaller scale in FIGS. 2 and 3 and in large scale in FIGS. 10, 13, 14, 15, 16 and 18.

In FIG. 10, the channel member A is shown supported by the perforated adjustable straps 80 on the transverse structural members 81, from which extend downwardly the support structures 82.

These support structures 82 at their lower ends have the top covered plate 83 with the down-turned side portions 84 and the in-turned portions 85 which fit into the recesses 48 between the upper and lower flange portions 47 and 46.

It will be noted that the air flows outwardly, as indicated at 86, from the chamber 41 through the slots 45, with the oblique faces 87 of the corners 51 directing the air downwardly and with the curved plates 88 directing the air outwardly.

These plates at their upper ends fit inside of the flanges 67 and against the central wall 66 and at their lower ends they rest against the horizontal flanges 68 and inside of the slots below the in-turned portions 70 above the side flanges 69.

The up-turned edge flanges 50 will support the side portion 89 of the formed acrylic panel E at the left and at the edge 90 of the metal louver construction F at the right.

Referring to the alternative structure shown in FIG. 13, an inlet conduit 40, such as shown in FIG. 3, is shown directing the air at 100 into the chamber 41 and the slots 45 with the outstanding plates 101 resting upon the top flanges 47 at the upper ends of the side walls 42.

In the structure of FIG. 13, alternatively to FIG. 10, there are shown light diffuser panels of plastic at G, having the edge gaskets 102 fitted inside of the upstanding side flanges 50, the upper edges of which support the bottom peripheral portions of the panels G.

In the structure of FIG. 14 the same linear or diffuser construction is shown, serving as an outlet with the air flowing inwardly, as indicated at 103, and then upwardly, as indicated at 104, into the duct or open plenum 105. This duct or open plenum has its lower portions turned inwardly at 106 to fit in the slots between the upper flange portions 47 and the lower flange portions 46.

The panels G with the gaskets 102 may be of the same shape and form as described in connection with FIG. 13.

In the structure shown in FIG. 15, the extruded section A may be of the same form and shape as already described and shown in connection with FIGS. 2, 3, 4 and 10 to 14.

It is, however, shown with extra T channel support members for the side structures or ceiling panels or louver systems.

The side flanges 49 carry the V-T cross-section member M at the left and the inverted T cross-section N at the right. The member M, as shown in FIG. 15, has the central vertical stem 107 with the top T cross-section 108 and the lower V flanges 109 and 110.

The inside V flange 110 contacts the wall 42, while the outside flange 109 engages the down-turned edge portion 111 of the formed translucent or transparent pan member 112.

At the right side of FIG. 15 the structure N has the central stem 113 and the outstanding flanges 114 and 115 terminating respectively in the cross members 116 and 117 and 118. The member 118 supports the edge 119 of the metal or plastic louver structure P.

Referring to FIGS. 16 and 17, the section A is shown connected to the duct 130 which contacts the vinyl seals 131 inserted between the flanges 46 and 47.

The screws 132 may be of the self-tapping type which will cut directly through the wall of duct 130 into the vinyl seals 131.

In the arrangement shown in FIGS. 18 and 19, the conduit 133 has a vinyl seal 134 mounted on the vertical flange 135 of the plate 136. The lower end 137 of the conduit extends into the chamber 41.

The flange 136 is held in position by the screws 138 which extend through both the upper flange 47 and the lower flange 46 (see particularly FIG. 9).

The lower part of the inverted T, as shown in FIGS. 10, 13, 15, 16 and 18, where used as an outlet, is in all instances provided with the curved deflector members 88 held inside of the in-turned end flanges 70 at their lower edges and at their upper edges inside of the down-turned edge or flange portions 67.

The upper portion of the deflector plates 88 contact the central vertical walls 66 in each instance, while the lower edges of the curved plates 88 contact the inside faces of the base portions 68.

In FIGS. 8, 9, 11 and 12 are shown arrangements for utilizing the beams or channels X and Y of FIGS. 5, 6 and 7 in ceiling construction.

Referring to FIG. 5, there is shown an inverted T, which may be utilized at positions 20, 21 and 22 in FIG. 1.

This inverted T has a central web 150 with a cross member 151. The ends of the cross member 151 have the up-turned edge flanges 152 (see FIG. 5).

At the upper end of the stem 150 are the transverse flanges 153 and 154 with an intermediate space 155 corresponding respectively to the elements 46, 47 and the space 48 of the structure, as shown in FIG. 4.

The half T members shown in FIGS. 6 and 7 have the vertical stem members 161, which are designed to be placed back to back with the base flanges 156 having the up-turned end flanges 157.

The stem members 161, at their upper ends, have the outwardly extending short flanges 158 and 159 with an intervening space 160.

The flanges 158 and 159 and the space 160 correspond in the structure of FIGS. 6 and 7 to the similar flanges 46 and 47 and the space 48 of FIG. 4.

FIGS. 8, 9, 11 and 12 show the manner in which the beam members or channel members of FIGS. 5 to 7 are utilized. In FIGS. 8, 9 and 11 the beam members X of inverted T cross section are suspended by the perforated adjustable straps 80 from the upper transverse structural members 81, as has already been described in connection with FIG. 10.

The lower ends of the suspension straps 80 are provided with inverted U-shaped clip members 175, which have in-turned end portions 176 fitting in the spaces 155 above the flanges 153.

Referring to FIG. 8, the corrugated vinyl sheet U, at its terminal convolution 177 will rest upon the sealing strip or gasket 178 held inside of the edge flange 152 on the base 151 of the beam structure X.

At the other side of FIG. 8 is provided the acrylic or Plexiglas flat panel W, the edge 179 of which rests on the seal or gasket 180.

In FIG. 9, the other edge 179 of the translucent or transparent plate W will also rest upon a seal or gasket 180 inside of the flange 152.

At the other side of FIG. 9 the formed acrylic or Plexiglas panel E has a stepped terminal portion 89. The stepped terminal portion 89 rests upon the upper part of the flange 152.

Referring to the structure of FIG. 11, the terminal portion 182 of the metal or plastic louver construction F rests on the up-turned edge flange 152.

At the other side of FIG. 11, the terminal downwardly facing convolution 177 of the corrugated vinyl or other translucent plastic sheet contacts the sealing strip 183 on the base flange 151.

Referring to FIG. 12, there is shown the use of the structure of FIGS. 6 and 7 connecting the ceiling arrangement to a wall structure S. The translucent or transparent plate or plaque R at its end fits into the U-shaped edge enclosure Q which is positioned inside of the flange 157 at the edge of the base 156. The other edge flange 157 abuts the wall S at 184.

The flanges 161 are positioned back to back and the inside flange 161 abuts the downwardly turned flange portion 185 of the Z cross section member P.

This member P has a support flange 186 attached to the wall S by the screws 187 and it has a horizontal flange 188 connecting the flanges 185 and 186. The corner 189 fits directly under the lower flange 158 of the inside member Y.

The applicant, by the structure shown, has provided a readily assembled and installed ceiling construction in which the diffuser and air admission and removal arrangements will be part of the ceiling and permit of high air circulating capacities, while avoiding stratification.

Illumination may be readily provided in connection with air diffusion, ventilation and conditioning, and the air is distributed in such a manner as not to interfere with the illumination characteristics of the ceiling.

The basic track or channel structure consists of the beam cross sections, as shown in FIGS. 4 to 7, and may be readily and inexpensively made of extruded aluminum or other light weight metal, and they may be conveniently suspended from an interior construction, as illustrated at 80 and 81 in FIGS. 8, 9 and 10.

Only three beam cross sections need be used, as illustrated in FIGS. 4 to 7. The structures, as shown, readily accommodate themselves to any desired size and shape of room and the use of guide plates 88, as shown in FIGS. 10, 13, 15, 16 and 18, will guide the inflow of air, together with the depending corners 51, so that there will be no smudge or discoloration resulting across the ceiling construction, inasmuch as the stream of air, as indicated by the arrows in FIGS. 10 and 13, will be deflected away from the ceiling plaques.

Any suitable type of ceiling plaques, whether transparent or translucent and whether of varying shapes and sizes, may be utilized, as for example as indicated at E and F in FIG. 10, at G in FIGS. 13 and 14, E, U and W in FIGS. 8 and 9.

Referring to FIGS. 20 and 21, these figures show the manner of sealing off the passageways or the preferred arrangement for permitting communication between the inlet and outlet conduits and the central structure, such as shown in FIGS. 4 and 10 to 18, where the inflowing or outflowing air is to be transferred from the conduits to the transverse beam structure.

In FIG. 20, between the side walls 42 and below the flanges 47, is positioned the U-shaped barrier 200, the side flanges 201 of which carry the sealing gaskets or contact pieces 202.

This will enable closure of the chamber 41, as shown in FIGS. 10 to 18, at any place along the structure of FIG. 4 so that one section may be used for inflowing conditioning or ventilating air and the other section may be used for outflowing conditioning air, for example as shown in FIG. 14.

In FIG. 21 is shown the manner of sealing a conduit 203 to the beam structure A by means of the plate 204 and the gaskets or sealing members 205 and 206. The members 206 may extend from side to side of the structure.

It is thus apparent that the applicant has devised an arrangement of great flexibility which may be employed in ceiling constructions with ready accommodation to the size and shape of the room or enclosure and without limitation to the height of the ceiling and with ready coordination of lighting appliances.

As many changes could be made in the above ceiling air diffuser, and many widely different embodiments of this invention could be made without departure from the scope of the claims, it is intended that all matter contained in the above description shall be interpreted as illustrative and not in a limiting sense.

Having now particularly described and ascertained the nature of the invention, and in what manner the same is to be performed, what is claimed is:

1. In a false ceiling structure for rooms and enclosures, including an interior supporting structure, a plurality of spaced transverse beam members mounted below said supporting structure and supported therefrom, and ceiling panels extending between and supported by said transverse beam members, said beam members and panels providing a false ceiling structure, the improvement in which a selected transverse beam member comprises spaced side walls and means cooperating therewith defining an elongated air-receiving and distributing chamber having a bottom provided with passageways opening into the space below the false ceiling structure, an elongated air guide member located directly below said chamber and having the cross-sectional shape of an inverted T with its stem extending downwardly and cooperating with the side walls of the chamber to provide an air-flow passageway at the bottom of the chamber on each side of said stem, means for supporting the elongated air guide member from said selected transverse beam member, the sides of the inverted T-shaped member extending laterally from the lower end of the stem respectively across said passageways in spaced relation thereto and to the bottom of the chamber, and an air-guide plate concave in cross-section mounted on each side of the stem of the air-guide member with its upper edge portion resting against the stem and its lower edge portion resting on a laterally-extending side of the air-guide member.

2. A ventilated ceiling structure as claimed in claim 1, in which the upper part of the stem includes a flange on each side extending over the upper edge of the guide plate on that side, and the outer edge of each of the laterally-extending sides of the inverted T-shaped member includes a flange structure extending upwardly at the lower edge of the guide plate.

3. In a false ceiling structure for rooms and enclosures, including an interior supporting structure, a plurality of spaced transverse beam members mounted below said supporting structure and supported therefrom, and ceiling panels extending between and supported by said transverse beam members, said beam members and panels providing a false ceiling structure, the improvement in which a selected transverse beam member comprises spaced vertically-extending side walls and means cooperating therewith defining an elongated air-receiving and distributing chamber having a bottom wall integral with said side walls and extending partly along the chamber, an elongated air guide member located directly below said chamber and having the cross-sectional shape of an inverted T with its stem extending downwardly and defining an air-flow passageway at the bottom of the chamber on each side of said stem, the upper part of the stem of the air-guide member being integral with said bottom wall of said chamber, and means for supporting the elongated air-guide member from said selected transverse beam member, the sides of the inverted T-shaped member extending laterally from the lower end of the stem respectively across said passageways in spaced relation thereto and to the bottom of the chamber.

4. In a false ceiling structure for rooms and enclosures, including an interior supporting structure, a plurality of spaced transverse beam members mounted below said supporting structure and supported therefrom, and ceiling panels extending between and supported by said transverse beam members, said beam members and panels providing a false ceiling structure, the improvement in which a selected transverse beam member comprises spaced vertically-extending imperforate side walls defining the side walls of an elongated air-receiving and -distributing chamber, means closing the top of the chamber, means for conducting air into said chamber at the top, an outwardly-projecting flange extending from the lower part of each side wall of the chamber for supporting ceiling panels, said selected beam member including a floor in the lower part of said chamber comprising an elongated central floor portion between and spaced from the side walls of the chamber and defining therewith an elongated air-flow passageway on each side of said elongated central floor portion opening into the space below the false ceiling structure, said selected beam member also including an elongated air-guide means located below and extending entirely along and supported by said central floor portion of the chamber, said elongated air-guide means comprising elongated air-flow guiding members extending from the bottom of said central floor portion respectively downwardly and outwardly therefrom and respectively across said air-flow passageways in spaced relation thereto and in spaced relation to said outwardly-projecting flanges and ceiling panels carried thereby.

References Cited in the file of this patent

UNITED STATES PATENTS

| | | |
|---|---|---|
| 781,538 | Lyster | Jan. 31, 1905 |
| 2,080,960 | Dreyfus | May 18, 1937 |
| 2,730,942 | Peterson | Jan. 17, 1956 |
| 2,833,199 | Wakefield | May 6, 1958 |
| 2,902,918 | Swarner | Sept. 8, 1959 |
| 2,920,357 | Ericson | Jan. 12, 1960 |
| 2,956,150 | Schwartz | Oct. 11, 1960 |

FOREIGN PATENTS

| | | |
|---|---|---|
| 1,106,998 | France | July 27, 1955 |
| 535,643 | Italy | Nov. 16, 1955 |